Nov. 3, 1953 K. K. PROBST 2,657,769
BRAKE
Filed Sept. 12, 1951 2 Sheets-Sheet 1
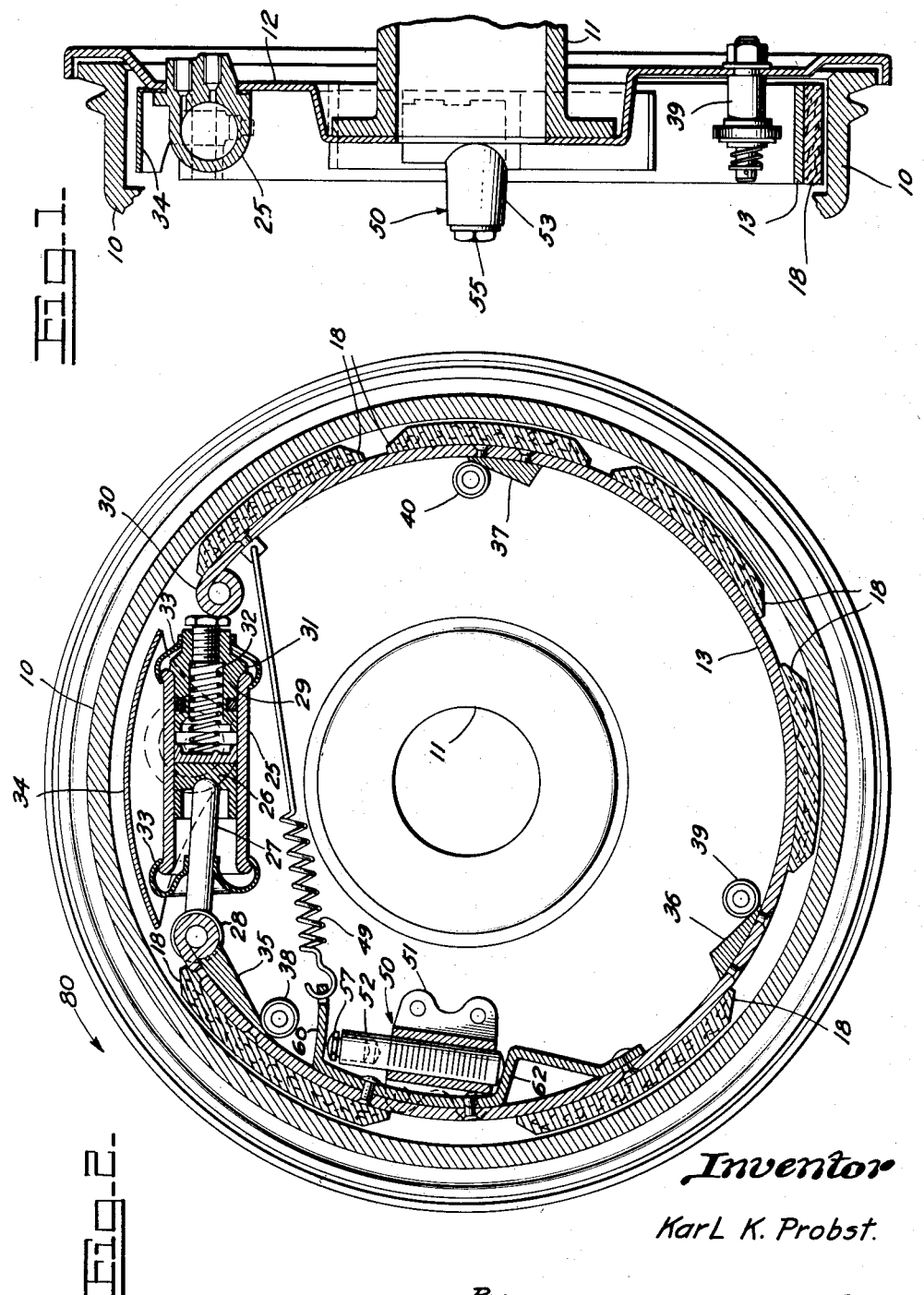
Inventor
Karl K. Probst.
By
Wayne S Gerber
Attorney

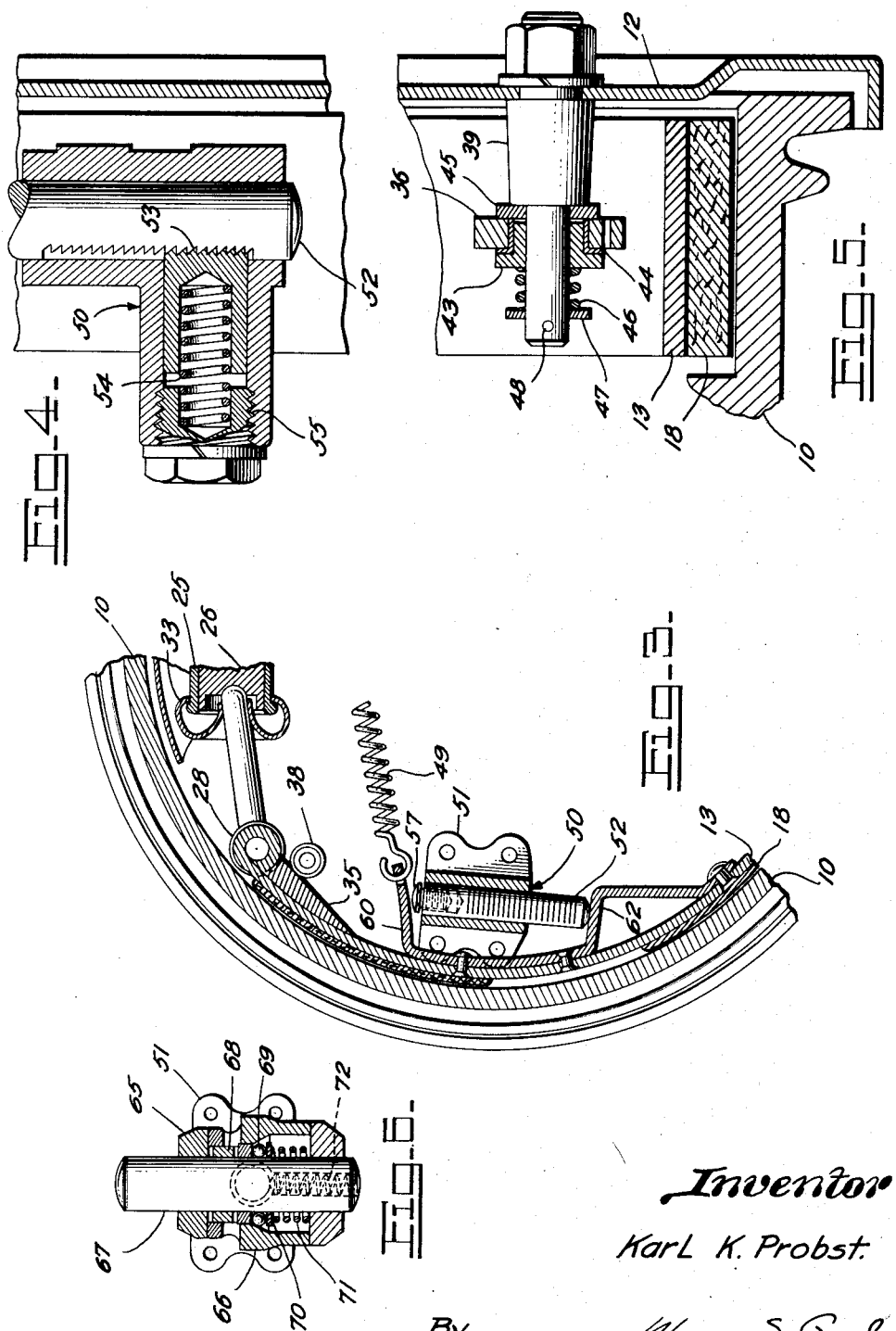

Patented Nov. 3, 1953

2,657,769

UNITED STATES PATENT OFFICE 2,657,769

BRAKE

Karl K. Probst, Columbus, Ohio

Application September 12, 1951, Serial No. 246,302

7 Claims. (Cl. 188—79.5)

This invention relates to brakes, and more particularly to an hydraulically operated internal expanding shoe type of brake suitable for vehicles, such as automobiles or trucks.

One of the objects of this invention is to provide a self-adjusting dual servo hydraulic brake of the type stated. It is also an object of the invention to provide a servo type of brake with cam means for centering the brake shoe relative to the brake drum. Another object is to provide a one-way acting locking means for moving the brake shoe circumferentially relative to the brake drum as the lining on the brake shoe wears whereby the cam means is utilized to expand the shoe sufficiently to compensate for the lining wear. A feature of this construction is that the circumferential movement or travel of the brake shoe is utilized to both (a) adjust the brake shoe for wear and (b) centralize the brake shoe relative to the drum.

Another object of the invention is to provide a one-piece brake shoe which, for example, can be constructed of spring steel or a similar material, and which is provided with cam surfaces adapted to cooperate with rollers formed with a flexible or deformable type of material, such as rubber or the like. A feature of this construction is that the rollers provide for centering the brake shoe relative to the brake drum and thereby secure even wear of the shoe. Furthermore, the rollers also allow for shifting of the brake shoe from the original center of the brake drum when the center of the latter shifts caused by distortion of the drum under certain loading conditions. The brake shoe is thus always centered relative to the drum and regardless of the fact that the center of the brake drum may shift.

It is also an object of the invention to provide a brake construction of the type described having piston means for moving the brake shoe wherein one end of the shoe is moved by a free acting piston and the other end of the shoe by a piston having a stop for limiting its travel in one direction. A feature of the construction provided is that the latter piston also serves as anchor or reaction stop which limits the circumferential movement of the shoe in one direction i. e. forward for example.

An additional object is to provide a friction type of locking means, for example, a ratchet or ball and cone mechanism for moving and holding the brake shoe in an adjusted position relative to the drum and which also serves as an anchor or reaction stop limiting the circumferential movement of the shoe in the other direction i. e. reverse for example.

Other objects of the invention and further advantages of the construction provided will be apparent from the following description, the appended claims and the accompanying drawings wherein a preferred embodiment of the invention is illustrated.

In the drawings:

Fig. 1 is an end view of the brake drum and shoe in vertical section, partly in elevation, taken on the center line of the drum;

Fig. 2 is a front view in vertical section, partly in elevation, taken just inside the head of a brake of the servo type and showing the position of the brake shoe and adjustinng means with the brake lining of normal thickness, i. e. not reduced from wear;

Fig. 3 is a partial view, similar to Fig. 2, showing the position of the brake shoe adjusted to compensate for lining wear;

Fig. 4 is a partial, enlarged vertical sectional and elevational view of the adjusting means and lock pin, including its supporting bracket;

Fig. 5 is a partial, enlarged elevational view, partly in section, showing the pin and roller construction for centering the shoe; and Fig. 6 is an enlarged elevational view, partly in section, showing a modified form of adjusting means and lock pin for holding the brake shoe in an adjusted position.

Referring further to the drawings, the brake drum 10, axle flange 11 and torque or backing plate 12 are shown in Fig. 1. In this embodiment of the invention, the brake friction member comprising a one-piece shoe 13 of spring steel construction is free to move circumferentially within the drum 10. Brake linings 18, which may be an asbestos molded type or other suitable material, are fastened to the shoe 13 in the usual manner. In operation the brake linings engage the drum to provide a braking action.

Means for moving the shoe to provide the braking action is provided in the form of a cylinder 25 mounted on the backing plate 12 by screws. A piston 26 slidably mounted within the cylinder 25 engages one end of shoe 13 as shown in Fig. 2. This end 27 of the shoe is in the form of a rod hinged to the eye 28. A second piston 29 also slidably mounted within the cylinder 25 engages the other end 30 of shoe 13 which is also in the form of an eye. This piston 29 is provided with a limit stop flange 31 which allows this piston to move freely in one direction only i. e. to the right as viewed in Fig. 2. Movement of this piston to the left is limited by engagement of the flange 31 with the end of the cylinder. In comparison, it is to be noted that piston 26 is free to move in either direction within the cylinder 25. These pistons are moved hydraulically, or by air pressure, from a source not shown, and in the customary manner. A return spring 32 is provided to facilitate the operation of the pistons. Rubber dust seals 33 are also provided to protect this mechanism. A shield or guard 34 fastened to the backing plate serves to protect the cylinder 25 and the piston operating fluid therein from the heat generated from the braking action.

A cam mechanism is provided for reducing the clearance between the drum 10 and the brake linings 18 as the latter wear in operation of the brake. This mechanism includes the cam surfaces 35, 36 and 37 formed in the inside of the shoe 13, Fig. 2.

Eccentric pins 38, 39 and 40 carried by the backing plate provide supports upon which the shoe 13 rides and serve to center the brake shoe within the drum. The construction and mounting of the pins 38, 39 and 40 is shown more clearly in Fig. 5. As illustrated, these pins each carry a bushing 43 formed of flexible or deformable material adapted to resiliently yield under pressure, such as rubber, for example. A stamped metal roller 44 mounted over the bushing engages the adjacent cam surface on the shoe, as shown in Fig. 5, the cam being retained between the turned edge of the roller and a washer 45. The retainer spring 46 held by the washer 47 and pin 48 bears against the end of bushing 43 and provides for holding the shoe to the backing plate. A spring 49 provides for returning the shoe from engagement with the drum when the cylinder pressure is released.

The lock means, indicated generally at 50 in Fig. 2, provides for shifting the position of the shoe circumferentially relative to the drum. This action causes the cam surface 35, 36 and 37 to move into engagement with the pins 38, 39 and 40 and expand i. e. move the shoe outwardly as the linings wear. Sufficient clearance is provided in the construction so that the cams do not function to apply pressure to the shoe i. e. a braking action. Means are thus provided for reducing the clearance between the drum and the shoe lining as the latter wears. The construction of the lock means 50 is shown most clearly in Figs. 2, 3 and 4. A bracket 51 carried by the backing plate forms a cylindrical support for the slidably mounted notched ratchet pin 52. Movement of the pin 52 i. e. adjustment is limited to one direction by the ratchet member 53, which is held in position by the spring 54 and threaded cap screw 55. One end of the pin 52, the upper end as seen in Fig. 2, is threaded to receive a hardened self-locking screw 57. In operation, the pin 52 is free to move in one direction only i. e. down from the position shown in Fig. 2 to the extreme limit shown in Fig. 3.

A stop member 60 is mounted on the inside of shoe 13 in spaced relation opposite to the screw 57. A second stop member 62 carried on the inside of shoe 13, opposite to the lower end of pin 52, is positioned to contact the end of pin 52.

In Fig. 6, a modified form of lock means is shown. The bracket 51 carries a spool 65 having a coned sleeve 66. A floating adjusting pin 67 is slidably mounted in the pin sleeve 68 which in turn is mounted in the coned sleeve 66. There are a number of small balls 69 carried on the washer 70 which is held in position by the coil spring 71. These balls can contact the sides of the pin 67 and the coned sleeve 66 as shown in Fig. 6. Thus in operation the pin 67 can move freely in one direction, i. e. downward as shown, and upward movement of the pin is prevented by the balls 69 wedging between the inwardly tapered sides of the coned sleeve 66 and the sides of pin 67. Pin 67 has a central bore at its lower end to receive the coil spring 72, which is held in the bore by the stop member 62. This spring 72 provides for holding the pin 67 in the raised or adjusted position, so that the weight of the pin does not cause a downward movement and release of the balls 69 from contact with the sides of the pin. With this construction, a somewhat faster adjustment is obtained than with the locking means 50 which requires movement equal to one notch of the ratchet before an adjustment is made.

The brake mechanism shown operates as follows:

When pressure is applied in the cylinder 25, the pistons 26 and 29 move the ends 27 and 30 of shoe 13 outwardly until the linings 18 contact the drum. Assuming the shoes are rotated forward, i. e. in the direction of the arrow 80, Fig. 2, the flange 31 of piston 29 engaging the end of cylinder 25 stops or limits the forward circumferential movement of the shoe 13. Thus, there is provided a reaction point for the forward movement on piston 29. When the shoe is moving in the reverse position, i. e. in the direction opposite to that of arrow 80, Fig. 2, the stop member 62 contacts the bottom of pin 52 which is held against any upward movement by the ratchet member 53 in the bracket 51. The pin 52, or locking means 50, thus limits the circumferential movement of the shoe in the reverse direction and forms a reaction point therefor. In the construction shown in Fig. 6, the stop member 62 contacts the bottom of pin 67 which is held against upward movement by contact of the balls 69 with the sides of pin 67 and the coned sleeve 66.

As the linings 18 wear down from brake operation, the shoe 13 will move around circumferentially until the stop member 60 engages with screw 57. Further circumferential movement of the shoe will cause the pin 52 to move down one notch when the wear plus deflection is equal to the adjustment spacing. Downward movement of the pin 52 (or pin 67) is transmitted through the stop member 62 and causes the shoe to shift position i. e. move circumferentially. Such movement brings the cam surfaces 35, 36 and 37 into engagement with the pins 38, 39 and 40 and causes the shoe to expand i. e. reduce the clearance between the shoe and the drum. It will be apparent to those skilled in this art that the rubber bushings on the pins 38, 39 and 40 yield under pressure and allow the center of the shoe to shift while centering in the drum to accommodate any shifting of the center of the drum caused by distortion or deflection.

From the above description it will be apparent that the brake mechanism disclosed is self-adjusting, simple and efficient in operation, and that it provides the advantages and carries out the objects stated. The description and drawings presented are of a preferred embodiment of the invention only. It will be apparent to those skilled in this art that various changes in details and arrangement of parts can be made without departing from the spirit and scope of the invention as defined by the claims appended hereto.

For this reason I do not wish to be restricted to the precise form or construction herein disclosed and shown.

Having thus described my invention, I claim:

1. A servo brake comprising, in combination, a brake drum; a circumferentially movable brake friction member adapted to engage said drum to provide a braking action; means for moving said friction member to provide a braking action with said drum; said means forming an anchor at one end of the friction member which limits the circumferential movement of the friction member in one direction; cam mechanism for reducing the clearance between said drum and friction member as the latter wears; and a lock means movable by said friction member for shifting the position of the friction member relative to the cam mechanism, said lock means forming an anchor limiting the circumferential movement of the friction member in the opposite of said direction.

2. A servo brake comprising, in combination, a brake drum; a circumferentially movable brake friction member adapted to engage said drum to provide a braking action; means for moving said friction member to provide a braking action with said drum; cam mechanism for reducing the clearance between said drum and friction member as the latter wears; and a pin slidably mounted for movement in one direction longitudinally with respect to the friction member and carried in a position for engagement with the friction member after the latter moves a predetermined amount circumferentially in one direction, said engagement with the friction member and further circumferential movement of the latter causes said pin to move and shift the position of the friction member relative to said cam mechanism.

3. A servo brake comprising, in combination, a brake drum; a brake friction member comprising a one-piece shoe free to move circumferentially to engage said drum and provide a braking action; piston means conneced to the free ends of said shoe for moving the latter into engagement with said drum to provide a braking action; mechanism for reducing the clearance between said drum and shoe as the latter wears including an eccentric pin and a cam; and a movably mounted pin having one end thereof in position for engagement with a stop member carried on the shoe when said shoe moves a predetermined amount circumferentially relative to said drum from shoe wear, whereby said pin is moved and its other end causes said cam to move relative to said eccentric pin.

4. In a hydraulic brake, a drum; a shoe having a brake lining for engagement with said drum; cylinder means including a piston for moving the shoe to provide a braking action with the drum; pin means for centering the shoe relative to said drum; cam means on the inside of said shoe adapted to engage said pin means as the shoe moves circumferentially to adjust the shoe for wear clearance.

5. In a hydraulic brake, a drum; a shoe having a brake lining for engagement with said drum; cylinder means including a piston for moving the shoe to provide a braking action with the drum; pin means for centering the shoe relative to said drum; cam means on the inside of said shoe adapted to engage said pin means as the shoe moves circumferentially to adjust the shoe for wear clearance; and means for holding said cam and pin means in engagement to maintain said adjustment.

6. In a hydraulic brake, a drum; a shoe; means for moving said shoe to provide a braking action with said drum; a reverse reaction stop on said shoe; cam means for centering said shoe relative to the drum; and holding means including a pin operated by circumferential movement of the shoe after a predetermined lining wear on said shoe for moving and holding the shoe in an adjusted position relative to said cam means.

7. In a hydraulic brake, a drum; a brake shoe; means for moving said shoe to provide a braking action with said drum; a yielding pin for supporting the shoe within the drum; a cam adapted to engage said pin when the shoe moves circumferentially a predetermined amount relative to said drum; and an adjustably mounted pin moved by circumferential movement of the shoe after a predetermined lining wear on said shoe for moving the shoe to engage said cam and said yielding pin whereby the shoe is moved to an adjusted position relative to the drum.

KARL K. PROBST.

References Cited in the file of this patent

UNITED STATES PATENTS

| Number | Name | Date |
|---|---|---|
| 1,735,206 | Madden | Nov. 12, 1929 |
| 2,055,330 | Bold | Sept. 22, 1936 |
| 2,330,883 | Hanna | Oct. 5, 1943 |
| 2,522,181 | Krikorian | Sept. 12, 1950 |
| 2,527,156 | Schuster | Oct. 24, 1950 |

FOREIGN PATENTS

| Number | Country | Date |
|---|---|---|
| 457,420 | Great Britain | Nov. 27, 1936 |